United States Patent
Kruijt et al.

(10) Patent No.: US 7,287,893 B2
(45) Date of Patent: Oct. 30, 2007

(54) LIQUID CRYSTAL DISPLAY, BACKLIGHT OF SUCH DISPLAY, AND A METHOD OF LIGHTING A LIQUID CRYSTAL DISPLAY

(75) Inventors: Wanda Susanne Kruijt, Eindhoven (NL); Boudewijn Michael Esser, Eindhoven (NL); Jan Marinus Van Oostveen, Eindhoven (NL); Adrianus Christianus Wilhelmus Custers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 2 days.

(21) Appl. No.: 10/524,181

(22) PCT Filed: Jul. 17, 2003

(86) PCT No.: PCT/IB03/03260

§ 371 (c)(1),
(2), (4) Date: Feb. 10, 2005

(87) PCT Pub. No.: WO2004/017130

PCT Pub. Date: Feb. 26, 2004

(65) Prior Publication Data

US 2005/0253981 A1    Nov. 17, 2005

(30) Foreign Application Priority Data

Aug. 15, 2002    (EP)    ................. 02078382

(51) Int. Cl.
*F21V 21/00*    (2006.01)
(52) U.S. Cl. ...................... 362/614; 362/225; 362/633; 362/632
(58) Field of Classification Search ................ 362/614, 362/225, 362, 551, 561, 632, 633
See application file for complete search history.

(56) References Cited

U.S. PATENT DOCUMENTS

| | | | | |
|---|---|---|---|---|
| 5,584,566 A | * | 12/1996 | Bowman et al. | 362/220 |
| 5,726,722 A | * | 3/1998 | Uehara et al. | 349/66 |
| 5,907,222 A | * | 5/1999 | Lengyel et al. | 315/158 |
| 6,089,739 A | * | 7/2000 | Yamamoto et al. | 362/561 |
| 2002/0039292 A1 | * | 4/2002 | Matsui | 362/297 |

FOREIGN PATENT DOCUMENTS

| JP | 06 273765 A | | 9/1994 |
|---|---|---|---|
| JP | 2001283624 A | * | 10/2001 |
| JP | 2003197018 A | * | 7/2003 |

* cited by examiner

Primary Examiner—Renee Luebke
Assistant Examiner—Mary Zettl

(57) ABSTRACT

A liquid crystal display includes a backlight device which having a housing in which at least one tube-like fluorescent lamp is present. The housing forms a substantially dust-proof space. Part of the lamp extends outside the housing through a wall of the housing, which wall abuts against the lamp in a substantially dust-tight manner at the location where the lamp passes through the wall.

20 Claims, 3 Drawing Sheets

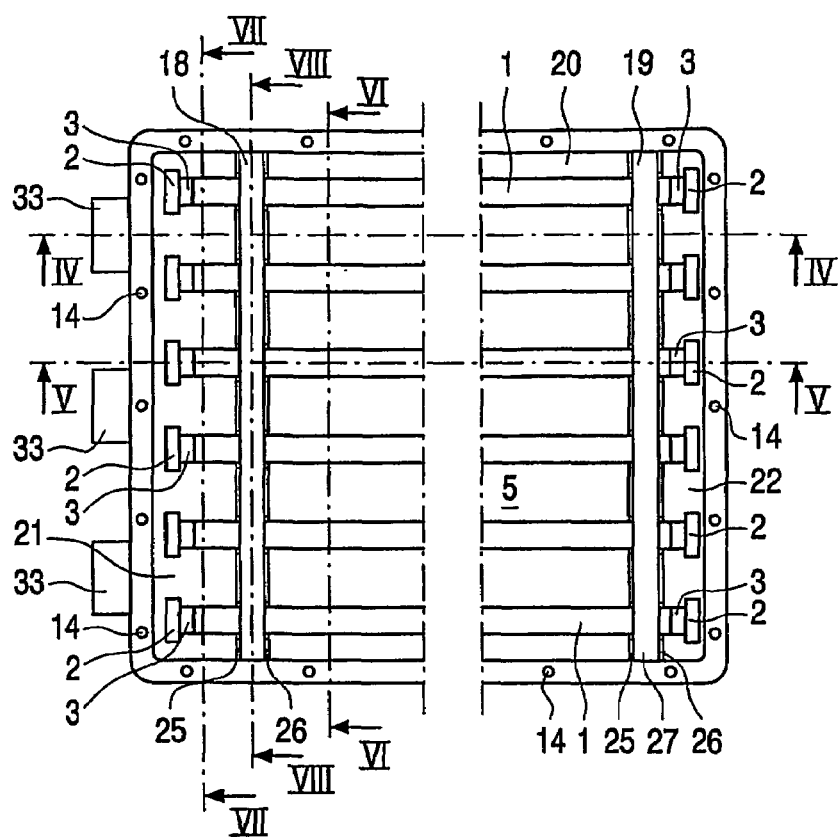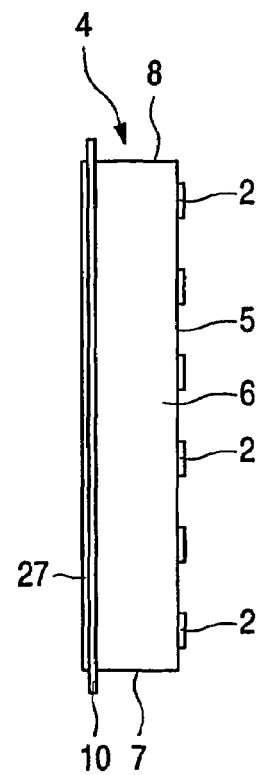
Fig.1  Fig.2
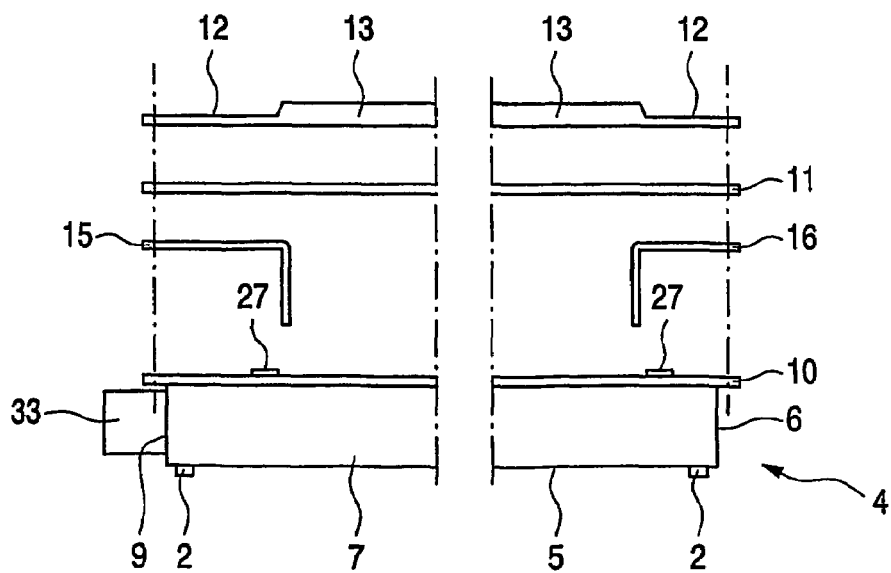
Fig.3

LIQUID CRYSTAL DISPLAY, BACKLIGHT OF SUCH DISPLAY, AND A METHOD OF LIGHTING A LIQUID CRYSTAL DISPLAY

The invention relates to a liquid crystal display including a backlight device which comprises a housing in which at least one tube-like fluorescent lamp is present.

A liquid crystal display comprises a crystal display matrix containing a liquid crystalline material. The light transmission of the crystalline material is determined by the orientation of the liquid crystalline material, which orientation is adjusted by applying a voltage across the material. The liquid crystalline material itself does not give light. The image that is shown on the crystal display matrix is produced by a backlight device which is arranged behind the matrix, in which backlight device one or more tube-like fluorescent lamps are present. The light from the lamps shines through the crystalline material, and the local differences in the orientation of the crystalline material result in the image that can be seen.

On the one hand it is important for the lamps to have an optimum light output, whilst on the other hand it is important that as much of the light as possible shines in the direction of the crystal display, and that in such a manner that the light is evenly distributed over the entire area of the crystal display matrix.

The light output of fluorescent lamps can be optimized by keeping the temperature of certain parts of the lamps within predetermined bounds. It is known to cool said parts for that purpose, for example by placing said parts into contact with a heat-conducting material capable of dissipating the excess heat. It is also known to obtain a cooling effect by placing the lamp in an air flow, which air flow can be generated by means of a fan.

In order to have as much light as possible shine in the direction of the crystal display matrix, it is usual to coat that part of the inside of the housing which is positioned behind the lamps with a reflective material.

In order to effect an even distribution of the light from the backlight device over the entire area of the crystal display matrix, that part of the inside of the housing which is positioned behind the lamps may be shaped in such a manner that the reflected light will shine in a desired direction. Furthermore, the provision of a diffuser plate, which diffuses the light, between the lamps and the crystal display matrix will help to achieve an even distribution of the light. The light transmission of the diffuser plate may be varied locally so as to compensate for differences in the light intensity of the lamps.

Said diffuser plate may abut against the front side of the housing and, together with the housing, form a space in which the fluorescent lamps are present, whilst the housing, including the diffuser plate, is mounted behind the crystal display matrix.

The object of the invention is to provide a liquid crystal display whose backlight device ensures that the crystal display matrix is properly lighted.

In order to accomplish that objective, the housing of the fluorescent lamp or lamps forms a substantially dustproof space, and part of the lamp extends outside the housing through a wall of said housing, which wall abuts against the lamp in a substantially dust-tight manner at the location where the lamp passes through the wall.

In order to prevent fouling of the fluorescent lamps and the reflective inner wall of the housing, it is important that said space is sealed dust-tight. This can be achieved by sealing the space airtight, which requires the provision of special seals, which is not always possible. If the space is not sealed airtight, air will flow into and out of the space regularly, because the temperature in the space varies. In that case measures must be taken to prevent the inflowing air from carrying dust and other impurities into the space.

The effect that is achieved by having parts of the lamp extend outside the housing is that the cooling of said parts can also take place outside the housing. If said cooling takes place through contact of the lamp with a heat-conducting material, said material is prevented from locally interfering with the lighting of the crystal display matrix. If said cooling is carried out by means of an air flow, said air flow does not need to be passed through the housing, which might lead to dust and other impurities finding their way into the housing, which is highly undesirable.

Furthermore it may be desirable for parts of the lamp to extend outside the housing so as to effect a proper distribution of the light. Parts that emit no light, or less light, such as parts present near the ends of the tube-like fluorescent lamp, can thus extend outside the housing through the wall of said housing, so that they will not have an adverse effect on the lighting process.

The effect that is achieved by providing a dustproof abutment between the wall of the housing and the lamp at the location where the lamp extends through said wall, is that dust is prevented from finding its way into the space, in particular when air, which may contain impurities, is blown against the part of the lamp that extends outside the space.

In one preferred embodiment, the aforesaid wall abuts against the glass, light-transmitting part of the lamp in a substantially dust-tight manner. The end of the tube-like lamp, on which a metal cap may be arranged, extends outside the space in that situation, and the seal around the lamp may be formed by a circular hole in the wall of the housing.

Preferably, the aforesaid wall comprises a flexible material which abuts against the lamp, which flexible material is preferably a synthetic foam material capable of proper abutment against the glass of the lamp.

In one preferred embodiment, the aforesaid wall comprises two parallel plates, preferably made of metal, between which the flexible material is arranged. The lamp extends through a recess in each of the two plates and through a corresponding recess in the flexible material in that case. The recesses in each of the metal plates may be larger than the recess in the flexible material, the dimension of which latter recess may be slightly smaller than the cross-sectional dimension of the lamp, so that a proper abutment of the material against the lamp is obtained.

In one preferred embodiment, the aforesaid part of the lamp extends into a channel through which air can flow so as to cool said part. A fan may be provided for generating the air flow.

Preferably, the housing abuts against a diffuser plate, so that the housing and the diffuser plate together form the dustproof space. To that end the seal may be arranged between the housing and a diffuser plate or other cover of the housing.

The invention furthermore relates to a backlight device comprising a housing in which at least one lamp is present, in which the housing forms a substantially dustproof space, in which part of the lamp extends outside the housing through the wall of said housing and in which the aforesaid wall abuts against the lamp in a substantially dust-tight manner at the location where the lamp extends through the wall.

The invention also relates to a method of lighting a liquid crystal display including a backlight device which comprises a housing in which at least one lamp is present, in which the lamp lights the liquid crystal matrix from the rear, in which the housing forms a substantially dustproof space, in which part of the lamp extends outside the housing through the wall of said housing and in which the aforesaid wall abuts against the lamp in a substantially dust-tight manner at the location where said lamp extends through the wall.

The invention will be explained in more detail hereinafter by means of a description of an embodiment of a liquid crystal display, in which reference is made to a drawing, in which:

FIG. 1 is a front view of backlight lamps in a light box;

FIG. 2 is a side elevation of said light box;

FIG. 3 is a side elevation of the light box, showing a diffuser plate and a frame with a crystal display matrix disposed above said light box;

Figure 4:
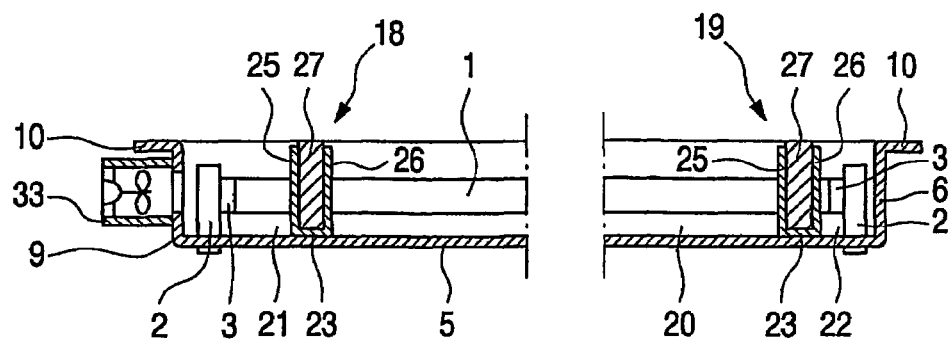
FIG. 4 is a sectional view along the line IV-IV in FIG. 1.

The figures are merely schematic representations of the embodiment, in which less relevant parts are not shown FIG. 1 shows six straight, mutually parallel tube-like fluorescent lamps 1, which are mounted in fittings 2 at their ends. The ends of the lamps 1, which are provided with a metal cap 3, extend into the fittings 2 with a pin 17 (see FIG. 5). The fittings 2 are mounted in a light box 4, which comprises a rear wall 5 and four side walls 6,7,8,9. The light box 4 is circumferentially provided with a flange 10 at its front side. The light box 4 that is shown in FIG. 1, together with the parts that are mounted thereon, is called a backlight device.

The fittings 2 are mounted on the rear wall 5 of the light box 4, extending through recesses in said rear wall to a position beyond the rear wall 5, at which position they are connected to electrical conducting wires (not shown) for supplying current.

FIG. 2 is a side elevation of the light box 4, showing the parts of the fittings 2 that project behind the light box. FIG. 3 is a side elevation of the light box 4 in another direction, in which the projecting parts of the fittings 2 are also shown.

In FIG. 3, two cover plates 15,16 as well as a diffuser plate 11 and a frame 12, in which a crystal display matrix 13 is arranged, are shown above the light box 4. In the assembled condition of the liquid crystal display, the cover plates 15,16, the diffuser plate 11 and the frame 12 are fixed to the flange 10 of the light box 4. Bolts may extend through the holes 14 (see FIG. 1) in the flange 10 to that end, and filling pieces and a sealing material may be used so as to obtain a proper abutment.

The diffuser plate 11 contributes to an even distribution of the light from the light box 4, so that the rear side of the crystal display matrix 13 is uniformly lighted. This results in an image on the front side of the crystal display matrix 13 that is determined by the orientation of the liquid crystals. Since the invention is concerned with the backlight of the display, the operation of the crystal display matrix 13 will not be discussed in more detail herein.

Figure 5:
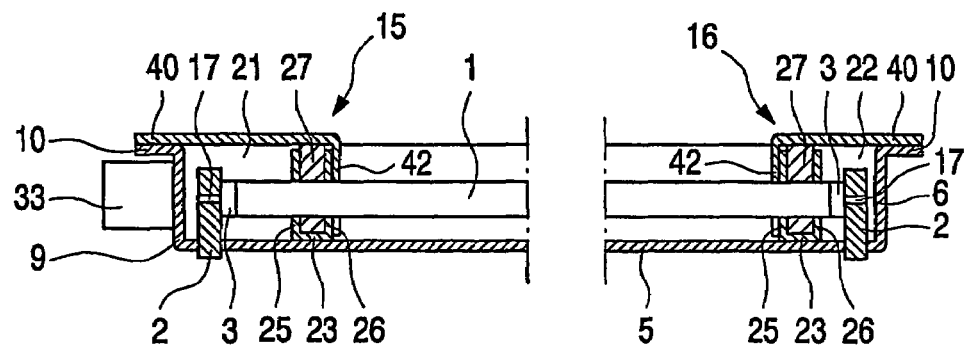
FIG. 5 is a sectional view along the line V-V in FIG. 1, in which cover plates are shown as well.

Two walls 18, 19 divide the light box 4 into a space 20 disposed behind the crystal display matrix 13, a channel 21 covered by the cover plate 15, and a space 22 covered by the cover plate 16. FIGS. 4 and 5 show the walls 18,19 in cross-sectional view, and FIG. 5 shows the cover plates 15,16. The lamps 1 are present in the space 20 for the larger part, each lamp 1 extending through the wall 18 into the channel 21 with one end and through the wall 19 into the space 22 with the other end. The space 20 is called the housing of the lamps 1.

Figure 9:
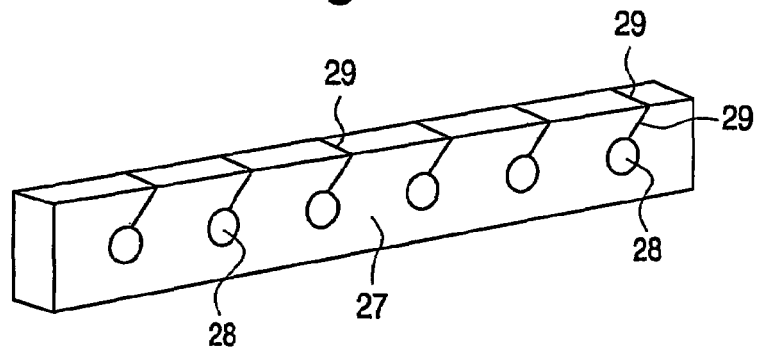
FIG. 9 is a perspective view of a piece of foam material.

As is shown in FIGS. 4 and 5, the wall 18,19 comprises a bent metal plate of U-shaped cross-section, the base 23 of which is attached to the rear wall 5 of the light box 4, while the legs form two parallel metal plates 25,26. Present between the two metal plates 25,26 is a block-shaped piece of a flexible, synthetic foam material 27, which is shown in perspective view in FIG. 9.

Figure 6:
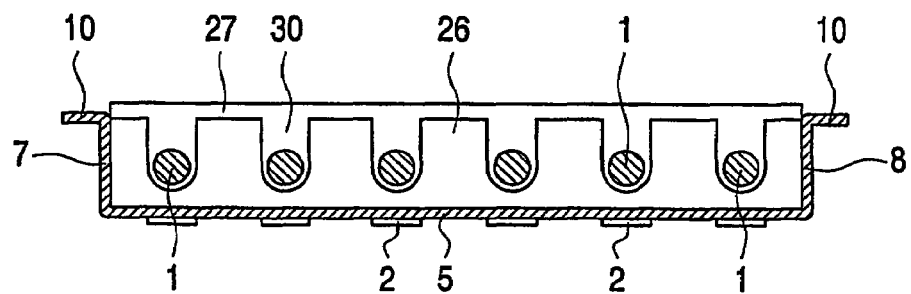
FIG. 6 is a sectional view along the line VI-VI in FIG. 1.
Figure 8:
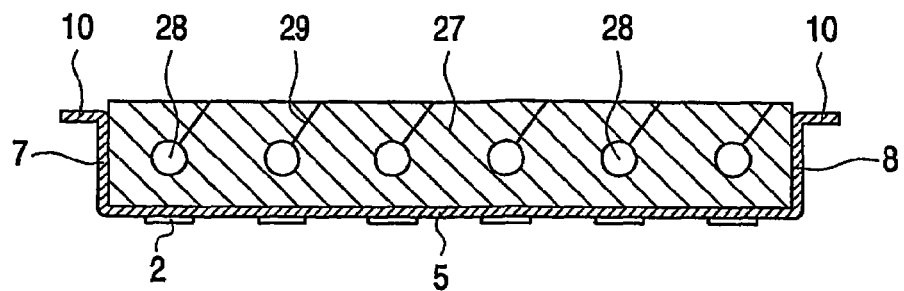
FIG. 8 is a sectional view along the line VIII-VIII in FIG. 1.

The piece of foam material 27 is provided with holes 28, through which the lamps 1 can extend, and with cuts 29 (only shown in FIGS. 8 and 9), thus making it possible to fit the lamps 1 after the piece of foam material 27 has been placed between the metal plates 25,26. FIG. 6 shows the wall 18 in side elevation, showing the recesses 30 in the plates 26 in which the lamps 1 are present. The dimension of said recesses 30 is larger than the diameter of the lamps 1, so that the lamps 1 do not touch the metal plates 26. The metal plate 25 is provided with corresponding recesses.

The diameter of the holes 28 is slightly smaller than that of the lamps 1, so that the foam material 27 abuts firmly against the glass of the lamps 1. Furthermore, the height of the block-shaped piece of for material 27 is greater than the height of the metal plates 25,26, so that the foam material 27 extends above the light box 4 (see FIGS. 2 and 3). As a result, the foam material 27 abuts firmly against the cover plates 15,16 in the fitted position of said cover plates in the light box 4. In this way a dustproof seal between the space 20 (the housing of the lamps 1) and the channel 21 and the space 22 has been obtained.

Because the space 20 is sealed dust-tight, impurities cannot enter the space, not even when air flows into or out of said space as a result of the temperature changes that occur within the space 20. This is important, in particular in order to keep the lamps 1 and the inner wall of the space 20, which is coated with a highly reflective material, free from impurities.

Figure 10:
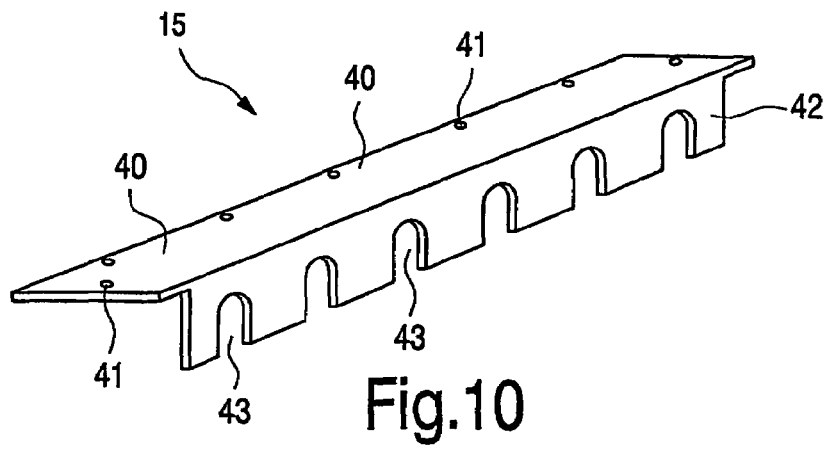
FIG. 10 is a perspective view of a cover plate.
Figure 11:
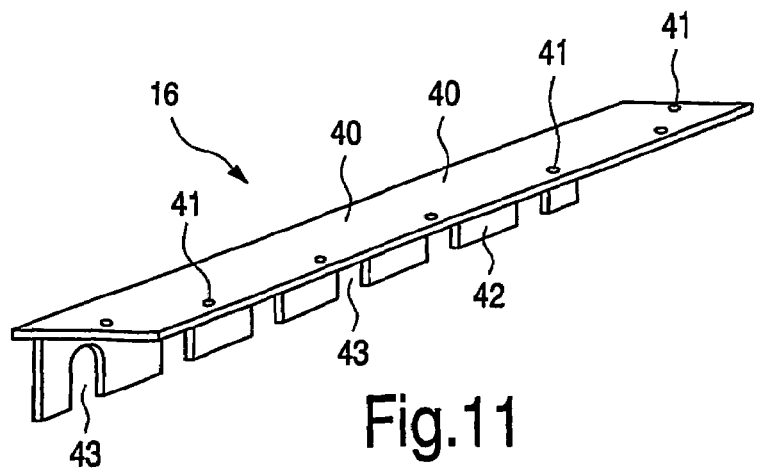
FIG. 11 is a perspective view of another cover plate.

FIGS. 10 and 11 show the cover plates 15,16. Each cover plate 15,16 comprises an upper part 40, which part has an edge in which holes 41 are present. Said edge can be attached to the flange 10 of the light box 4, with the holes 41 corresponding to the holes 14. Each cover plate 15,16 comprises a part 42, which part extends perpendicularly to the upper part 40. Said part 42 is provided with recesses 43, through which the lamps 1 extend in the mounted position of the cover plate 15,16 in the light box 4. In that position, the part 42 of the cover plate 15 abuts against the metal plates 26 of the wall 18, and the part 42 of the cover plate 16 abuts against the metal plate 25 of the wall 19, as is shown in FIG. 5.

As FIG. 5 shows, the ends of each lamp 1 extend into the channel 21 on the one hand and into the space 22 on the other hand, which channel and which space are both sealed dust-tight from the space 20 in which the lamps 1 are present. As a result, the fittings 2 are not arranged in the space 20 that is present behind the crystal display matrix 13 (see FIG. 3), but outside said space, as is the cap 3 that is present on the end of the lamp 1. Only the part of the lamp 1 that provides a good light emission is present in the space 20, so that a good and even lighting of the crystal display matrix 13 is obtained.

Since the fittings 2 are not present in the housing of the lamps 1 (space 20), they can extend through the rear wall of the light box 4, without a dustproof seal being required at that location.

The so-called cold spot of the lamp, whose temperature must be kept within predetermined bounds in order to obtain a proper light output of the lamps 1, is present in the parts of the lamps 1 that extend through the wall 18 into the channel 21. Present within the cold spot is a space in which condensation of the mercury that is contained within the lamp takes place.

Figure 7:
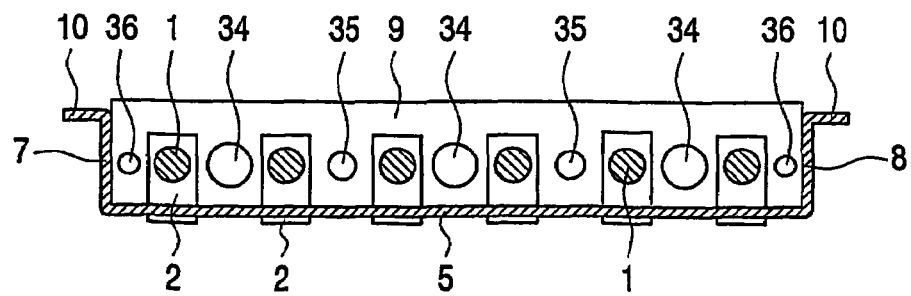
FIG. 7 is a sectional view along the line VII-VII in FIG. 1.

The air that flows through the channel 21 cools the ends of the lamp 1 extending into the channel 21. A sensor (not shown) measures the temperature of the end of one or more lamps and turns three fans 33 on or off in dependence on the measured temperature. Each of said fans 33 blows air into the channel 21 via holes 34 present between the ends of two lamps 1, whilst the air flows out of the channel 21 via two large holes 35 and two small holes 36 in the wall 9 of the light box 4. The holes 34,35,36 are shown in FIG. 7.

A suitable selection of the location of the holes 35,36 will result in the ends of the lamps 1 all being cooled to the same extent when the fans 33 are activated. The same obtains when the fans do not blow air into the channel 21 but extract air therefrom, so that air flows into the channel 21 through the holes 35,36.

The embodiment of a liquid crystal display as described above is merely an example; a great many other embodiments are possible.

The invention claimed is:

1. A liquid crystal display including a backlight device which comprises a housing in which at least one fluorescent lamp is present, wherein the housing forms a substantially dustproof space, and wherein part of the lamp extends outside the housing through a wall of said housing, said wall abutting against the lamp in a substantially dust-tight manner at a location where the lamp passes through the wall, wherein the wall comprises two parallel plates between which a flexible material is arranged, and wherein the flexible material abuts against the lamp.

2. The liquid crystal display as claimed in claim 1, wherein said wall abuts against a glass light-transmitting part of the lamp in a substantially dust-tight manner.

3. the liquid crystal display as claimed in claim 1, wherein said flexible material is a synthetic foam material.

4. The liquid crystal display as claimed in claim 1, wherein recesses in each of the plates are larger than further recesses in the flexible material, through which further recesses the lamp extends.

5. The liquid crystal display as claimed in claim 1, wherein said part of the lamp extends into a channel through which air can flow.

6. The liquid crystal display as claimed in claim 5, further comprising a fan which is capable of generating an air flow through the channel.

7. The liquid crystal display as claimed in claim 1, wherein the housing abuts against a diffuser plate.

8. A backlight comprising the liquid crystal display as claimed in claim 1.

9. A method of lighting a liquid crystal display including a backlight device comprising a housing in which at least one lamp is present, in which the lamp backlights the liquid crystal display, wherein the housing forms a substantially dustproof space, and wherein part of the lamp extends outside the housing through a wall of said housing, said wall abutting against the lamp in a substantially dust-tight manner at a location where said lamp extends through the wall, wherein the wall comprises two parallel plates between which a flexible material is arranged, and wherein the flexible material abuts against the lamp.

10. The method of claim 9, wherein said wall abuts against a glass light-transmitting part of the lamp in a substantially dust-tight manner.

11. The method of claim 9, wherein said flexible material is a synthetic foam material.

12. The method of claim 9, wherein recesses in each of the plates are larger than further recesses in the flexible material, through which further recesses the lamp extends.

13. The method of claim 9, wherein said part of the lamp extends into a channel through which air can flow.

14. The method of claim 13, wherein a fan which is capable of generating an air flow through the channel.

15. The method of claim 9, wherein the housing abuts against a diffuser plate.

16. A display comprising:
a housing having a base, outer walls and inner walls;
a first surface supported by at least one of the outer walls and inner walls, the inner walls separating an inner space and an outer space; and
at least one light source having a translucent body located in the inner space and at least one end extending into the outer space through at least one inner wall of the inner walls;
wherein the inner space extends from the first surface to the base and forms a dust-proof enclosure of the body.

17. The display of claim 16, wherein one outer wall of the outer walls includes at least one opening configured to allow air into the outer space.

18. The display of claim 16, wherein one outer wall of the outer walls includes at least one opening configured to allow air into the outer space, said one outer wall being substantially perpendicular to an axis of the at least one light source.

19. The display of claim 16, further comprising a fan configured to blow air into the outer space through at least opening of the outer walls.

20. A display comprising:
a housing having a base, outer walls and inner walls;
a first surface supported by at least one of the outer walls and inner walls, the inner walls separating an inner space and an outer space; and
at least one light source having a body located in the inner space and at least one end extending into the outer space through at least one inner wall of the inner walls;
wherein the inner space extends from the first surface to the base and completely encloses the body, and
wherein the inner walls comprise two parallel plates sandwiching a flexible material; the at least one end extending into the outer space through the flexible material.

* * * * *